United States Patent
Nam

(10) Patent No.: US 9,097,903 B2
(45) Date of Patent: Aug. 4, 2015

(54) 3D DISPLAY DEVICE AND SELECTIVE IMAGE DISPLAY METHOD THEREOF

(75) Inventor: Sangwook Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 849 days.

(21) Appl. No.: 13/378,060

(22) PCT Filed: May 20, 2010

(86) PCT No.: PCT/KR2010/003207
§ 371 (c)(1),
(2), (4) Date: Dec. 14, 2011

(87) PCT Pub. No.: WO2010/147311
PCT Pub. Date: Dec. 23, 2010

(65) Prior Publication Data
US 2012/0086774 A1   Apr. 12, 2012

Related U.S. Application Data

(60) Provisional application No. 61/187,645, filed on Jun. 16, 2009.

(51) Int. Cl.
| | | |
|---|---|---|
| H04N 13/04 | (2006.01) | |
| G02B 27/22 | (2006.01) | |
| G02B 27/26 | (2006.01) | |
| H04N 13/00 | (2006.01) | |
| G06K 9/36 | (2006.01) | |
| G06F 3/041 | (2006.01) | |

(52) U.S. Cl.
CPC ............ *G02B 27/2264* (2013.01); *G02B 27/26* (2013.01); *H04N 13/0048* (2013.01); *H04N 13/0434* (2013.01); *A63F 2300/30* (2013.01); *A63F 2300/8088* (2013.01)

(58) Field of Classification Search
CPC .................... H04N 13/0055; H04N 19/00769; H04N 13/0239; H04N 13/0059; H04N 13/0048
USPC ......................................................... 348/43
See application file for complete search history.

(56) References Cited

U.S. PATENT DOCUMENTS

| | | | | |
|---|---|---|---|---|
| 5,974,153 A | * | 10/1999 | Cashion et al. | 381/11 |
| 6,236,730 B1 | * | 5/2001 | Cowieson et al. | 381/18 |

(Continued)

FOREIGN PATENT DOCUMENTS

| | | |
|---|---|---|
| CN | 1496177 A | 5/2004 |
| CN | 1882106 A | 12/2006 |

(Continued)

*Primary Examiner* — Sath V Perungavoor
*Assistant Examiner* — Howard D Brown, Jr.
(74) *Attorney, Agent, or Firm* — Birch, Stewart, Kolasch & Birch, LLP

(57) ABSTRACT

An image display method displaying a stereoscopic 3D image, displaying both images of heterogeneous contents, or displaying an image according to a 2D scheme, and a 3D display device for implementing the display method are disclosed. The 3D display device receives a broadcast signal and restores a base view image signal and an extended view image signal constituting a pair of stereoscopic images. In a first operation mode, the 3D display device formats the base view image signal and the extended view image signal and displays the same according to a stereoscopic scheme. In a second operation mode, the 3D display device synthesizes two image signals different from the pair of stereoscopic images and displays the synthesized images.

11 Claims, 7 Drawing Sheets

(56) References Cited

U.S. PATENT DOCUMENTS

| | | | |
|---|---|---|---|
| 7,650,036 B2 * | 1/2010 | Lei et al. | 382/232 |
| 8,265,453 B2 * | 9/2012 | Okubo et al. | 386/241 |
| 8,811,663 B2 * | 8/2014 | Brown et al. | 382/103 |
| 2004/0223049 A1 | 11/2004 | Taniguchi et al. | |
| 2007/0052729 A1 | 3/2007 | Fukushima et al. | |
| 2007/0266412 A1 | 11/2007 | Trowbridge et al. | |
| 2009/0051685 A1 * | 2/2009 | Takagi et al. | 345/419 |
| 2010/0149120 A1 * | 6/2010 | Lee et al. | 345/173 |
| 2011/0310224 A1 * | 12/2011 | Lee et al. | 348/43 |
| 2012/0162367 A1 | 6/2012 | Ha | |

FOREIGN PATENT DOCUMENTS

| | | |
|---|---|---|
| CN | 1925628 A | 3/2007 |
| JP | 2005-110120 A | 4/2005 |
| JP | 2008-244835 A | 10/2008 |
| JP | 2009-49751 A | 3/2009 |
| KR | 10-2004-0084874 A | 10/2004 |

* cited by examiner

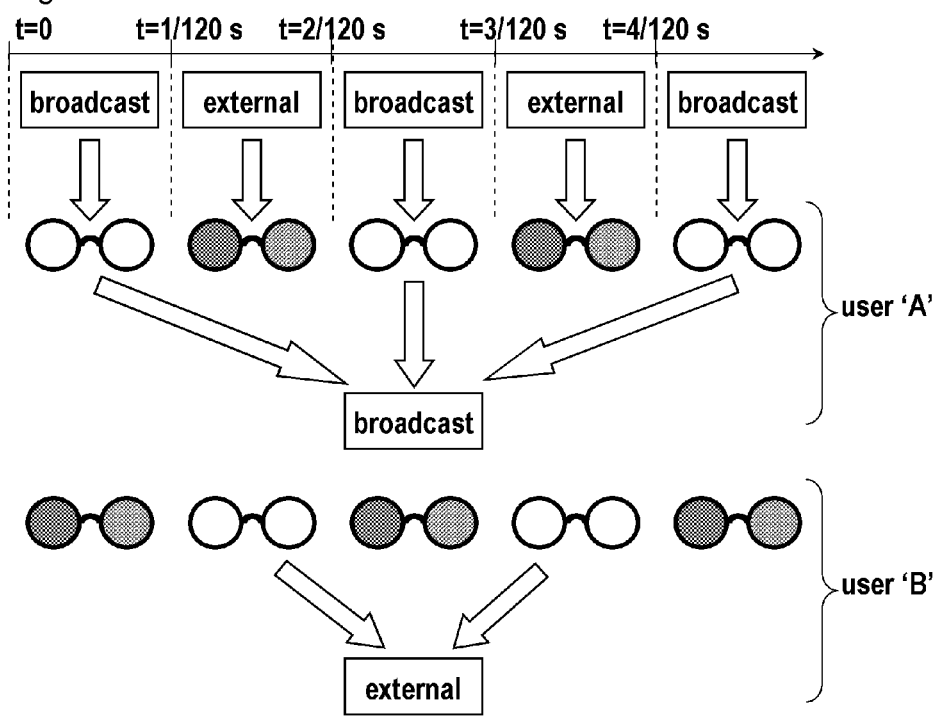

3D DISPLAY DEVICE AND SELECTIVE IMAGE DISPLAY METHOD THEREOF

This application is a National Phase of PCT/KR2010/003207 filed on May 20, 2010, which claims priority under 35 USC 119(e) to U.S. Provisional Application No. 61/187,645 filed on Jun. 16, 2009, all of which are hereby expressly incorporated by reference into the present application.

TECHNICAL FIELD

The present invention relates to an image display device and method and, more particularly, to a 3D display device and an image display method of the 3D display device.

BACKGROUND ART

The advancement of television technique has reached a level of implementing a device for displaying a stereoscopic image. Various stereoscopic image display schemes have been proposed, and at a time when the present invention was filed, a full-fledge commercialization of a stereoscopic type 3D television was at hand. In a stereoscopic 3D system, two images are captured by using two image sensors which are away from each other by about 65 millimeters, just like the human's eyes, and the captured images are transmitted as a broadcast signal to a receiver. Then, the receiver makes the two images inputted to left and right eyes of a viewer (i.e., a user), thereby simulating binocular disparity to allow for a depth perception and stereoscopic vision.

In the stereoscopic display device, two images, namely, left and right images, constituting a pair of stereoscopic images are accurately inputted to the left and right eyes of the viewer. That is, the two images are prevented to be simultaneously inputted to any one of the two eyes to cause interference. A method for preventing interference includes a polarization method, a time-sequential method, and the like. In the polarization method, a phase modulation plate is mounted on a display panel to allow left and right images to have mutually orthogonal polarization, an a polarization filter mounted in polarization glasses put on by the user makes left and right images inputted only to left and right eyes. In a time sequential method, left and right images are alternately displayed on the display panel. In this case, when a left image is displayed, only a left-eye shutter of active glasses put on by the user is open, an when a right image is displayed, only a right-eye shutter is open, thereby allowing left and right images to be inputted only to the left and right eyes, respectively.

However, it is not appropriate to provide a PIP function to the stereoscopic type 3D television because the PIP function may hamper the presence (or a sense of realism) of 3D images. As a result, every viewer must view the same 3D images. Meanwhile, a method for providing a supplementary function to a display device by using the characteristics of simultaneously displaying two images constituting a pair of stereoscopic images has not been proposed yet.

Also, in case where only some contents are provided as 3D while the other contents are provided as 2D at the early stage of 3D broadcasting, or in case where contents created as 2D in the past are broadcasted, it may not be proper to display 2D contents according to the 3D scheme. Thus, a method for displaying an image both as a 3D image and as a 2D image according to types of contents or according to a user selection is urgently required.

SUMMARY OF THE INVENTION

Therefore, in order to address the above matters, the various features described herein have been conceived.

An aspect of the present invention provides an image display method capable of displaying a stereoscopic 3D image, displaying both images of heterogeneous contents, or displaying an image according to a 2D scheme.

Another aspect of the present invention provides a 3D display device for implementing the display method.

According to an aspect of the present invention, there is provided an image display method implemented in a 3D display device. The 3D display device receives a broadcast signal and restores a base view image signal and an extended view image signal constituting a pair of stereoscopic images. In a first operation mode, the 3D display device formats the base view image signal and the extended view image signal and displays the same according to a stereoscopic scheme. In a second operation mode, the 3D display device synthesizes two image signals different from the pair of stereoscopic images and displays the synthesized images.

Both of the two image signals displayed after being synthesized in the second operation mode may be the base view image signals.

In an exemplary embodiment of the present invention, the 3D display device may interpolate the base view image signal to generate an interpolated image signal. In this case, the 3D display device may synthesize the base view image signal and the interpolated image signal and display the same in the second operation mode. Both of the two image signals displayed after being synthesized in the second operation mode may be the interpolated image signals.

The two image signals displayed after being synthesized in the second operation mode may be a base view image signal and an external input signal. The two image signals may be first and second external input signals.

In an exemplary embodiment of the present invention, the operation mode may be determined by a user command applied via an input unit of the 3D display device. In a different exemplary embodiment, the operation mode may be determined according to image attribute information included in the broadcast signal.

According to another aspect of the present invention, there is provided a 3D display device including: a display unit, a signal receiving unit, a signal synthesizing unit, and a controller. The signal receiving unit receives a broadcast signal and restores a base view image signal and an extended view image signal constituting a pair of stereoscopic images. The signal synthesizing unit formats the base view image signal and the extended view image signal in a first operation mode, formats two image signals different from the pair of stereoscopic images in a second operation mode, and supplies the formatted signals to the display unit. The controller determines the operation mode.

In a preferred exemplary embodiment of the present invention, the 3D display device includes at least one external input terminal.

The signal synthesizing unit may include a switching unit and a formatter. The switching unit may receive the base view image signal and the extended view image signal from the signal receiving unit, receive an external input signal from the external input terminal, and select two signals from among the received signals in response to a switching control signal. The formatter may format the two selected signals. The switching control signal may be generated by the controller according to the operation mode and supplied.

In an exemplary embodiment of the present invention, the signal synthesizing unit may include an interpolating unit configured to receive the base view image signal, interpolate it, and supply the interpolated image signal to the switching unit.

In an exemplary embodiment of the present invention, the formatter may format the two selected signals through spatial interleaving. In this case, the display unit may include a panel with a polarization film installed on its front surface.

In a different exemplary embodiment of the present invention, the formatter may format the two selected signals according to a time-sequence scheme by frame. In this case, preferably, the 3D display device is used together with shutter glasses. The shutter glasses include a left-eye shutter and a right-eye shutter and have first to third modes determined according to an opening and shutting control signal. In the first mode, the left-eye shutter and the right-eye shutter are open and shut by turns, and in the second mode, the left-eye shutter and the right-eye shutter may be open and shut at the same time. The opening and shutting control signal may be generated by the controller.

According to exemplary embodiments of the present invention, a television receiver is capable of displaying a stereoscopic 3D image or a 2D image according to types of broadcast signals or according to a user selection. Also, images of heterogeneous contents can be simultaneously displayed so that the user can view simultaneously two types of images on the entire screen with the television receiver. Accordingly, the application or utilization of the television receiver can be extended and the utility of the television receiver can be increased.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 20 illustrates an image displayed on the display panel and an image transferred to the visual nerve of each user when two users view an image with shutter glasses in the second and third operation modes respectively.

DESCRIPTION OF EMBODIMENTS OF THE INVENTION

Figure 1:
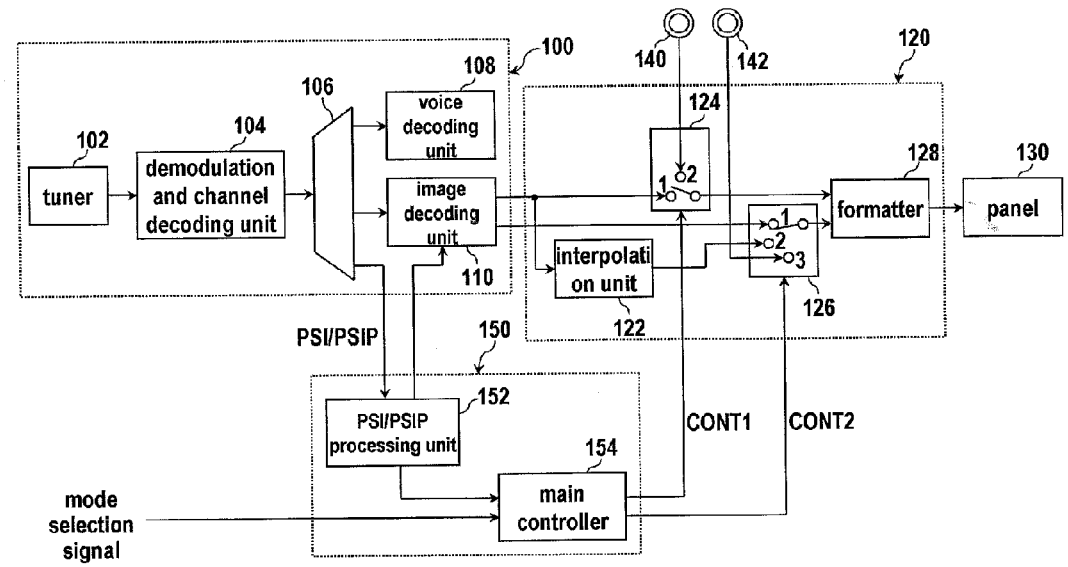
FIG. 1 is a schematic block diagram of a television receiver according to one exemplary embodiment of the present invention.

FIG. 1 is a schematic block diagram of a television receiver according to one exemplary embodiment of the present invention. The television receiver according to one exemplary embodiment of the present invention illustrated in FIG. 1 may receive a three-dimensional (3D) broadcast signal via ground waves or a cable TV network and display a 3D image corresponding to the 3D broadcast signal according to a stereoscopic scheme. In particular, the television receiver according to the present exemplary embodiment is suitable for a user (i.e., viewer) to view an image with polarization glasses. The television receiver includes a broadcast signal receiving unit 100, a synthesizing unit 120, a display panel 130, and a system controller 150.

The broadcast signal receiving unit 100 receives a broadcast signal and restores an image signal. The broadcast signal receiving unit 100 includes a tuner 102, a demodulation and channel decoding unit 104, a transport demultiplexing unit 106, a voice decoding unit 108, and an image decoding unit 110. The tuner 102 selects a broadcast signal of one channel selected by the user from among a plurality of broadcast signals and outputs the same. The demodulation and channel decoding unit 104 demodulates the broadcast signal transferred from the tuner 102, performs error correction decoding on the demodulated signal, and then outputs a transport stream (TS). The transport demultiplexing unit 106 demultiplexes the TS to separate a video PES and an audio PES, and extracts PSI/PSIP information. A packet releasing unit (not shown) releases packets with respect to the video PES and the audio PES to restore the video ES and the audio ES. The voice decoding unit 108 decodes the audio ES and outputs an audio bit stream. The audio bit stream is converted into an analog voice signal by a digital-to-analog converter (not shown), amplified by an amplifier (not shown), and then outputted via a speaker (not shown). The image decoding unit 110 decodes the video ES to extract a video bit stream. The image decoding unit 110 decodes the video bit stream and outputs a left image signal and a right image signal in order to implement a stereoscopic 3D image.

The synthesizing unit 120 receives the restored left and right image signals and external input signals and synthesizes images to be displayed on the display panel 130 according to the types of broadcast signals or according to a user selection. In the present exemplary embodiment, the synthesizing unit 120 includes an interpolation unit 122, first and second switches 124 and 126, and a formatter 128.

The interpolation unit 122 receives a base view image signal and interpolates the received image signal. Here, it is assumed that the left image signal is a base view image signal and the right image signal is an extended view image signal. When the restored left image signal has a top-down format, the interpolation unit 122 interpolates the base view image signal by horizontal line (i.e., in the unit of horizontal line). When the restored left image signal has a side-by-side format, the interpolation unit 122 interpolates the base view image signal by vertical line. In the present exemplary embodiment, the interpolation unit 122 outputs an image signal with respect to pixel lines which are not included in the left image signal and have pixel values determined through interpolation, as an interpolated signal.

The first switch 124 receives the left image signal from the image decoding unit 110 by a first input terminal thereof, and receives a first external input signal received via a first external input terminal by a second input terminal thereof. An output terminal of the first switch 124 is connected with a first input terminal of the formatter 128. A switching position of the first switch 124 varies according to a first switching control signal CONT1.

The second switch 126 receives the right image signal from the image decoding unit 110 by a first input terminal thereof, receives the interpolated signal from the interpolation unit 122 by a second input terminal thereof, and receives a second external input signal received via a second external input terminal 142 by a third input terminal thereof. An output terminal of the second switch 126 is connected with the second input terminal of the formatter 128. A switching position of the second switch 126 varies according to a second switching control signal CONT2.

The formatter 128 formats the signal (referred to as a 'first output signal', hereinafter) received via the first input terminal and the signal (referred to as a 'second output signal', hereinafter) received via the second input terminal while comparing frame times, so that temporally consistent images can be displayed by pairs on the display panel 130.

The display panel 130 includes a liquid crystal panel and a panel driving circuit for converting the left and right image signals such that they are suitably displayed on the liquid crystal panel, and generating various control signals such as a timing control signal or a driving signal. In the present exemplary embodiment, the display panel 130 formats the signals received via the input terminals by interleaving them in the unit of horizontal lines. A pair of polarization films each having a different polarization direction by 90 degrees are attached on the front surface of the display panel 130. Among the pair of polarization films, a first polarization film polarizes an image according to the first output signal (referred to as a 'first output image', hereinafter), and the second polarization film polarizes an image according to the second output signal (referred to as a 'second output image', hereinafter) in a direction different by 90 degrees from that of the first polarization film.

The PSI/PSIP processing unit 152 of the system controller 150 receives PSI/PSIP information from the transport demultiplexing unit 106, parses the received PSI/PSIP information, and stores the parsed information in a memory or a register, so that broadcast signals can be decoded and a broadcast can be reproduced based on the stored information. The main controller 154 of the system controller 150 controls overall operations of the television receiver. In particular, the main controller 154 receives a mode selection signal from a manipulation panel provided on a front surface or on a side surface of a remote controller (not shown) or the television receiver, and generates the first switching signal CONT1 and the second switching signal CONT2 in response to the mode selection signal.

Meanwhile, the user using the television receiver illustrated in FIG. 1 may view an image by using polarization glasses. In a preferred exemplary embodiment of the present invention, there are three types of polarization glasses.

Figure 2:
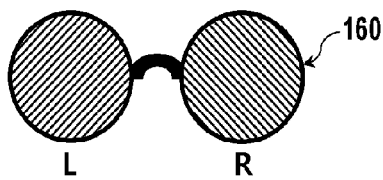
FIG. 2 illustrates a polarization pattern of a first type polarization glasses.
Figure 3:
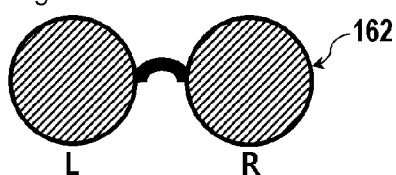
FIG. 3 illustrates a polarization pattern of a second type polarization glasses.
Figure 4:
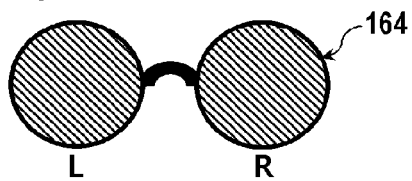
FIG. 4 illustrates a polarization pattern of a third type polarization glasses.

As shown in FIG. 2, a polarization film having the same polarization direction as that of the first polarization film attached to the display panel 130 is attached on the left-eye glass of the first type polarization glasses 160, so the left-eye glass allows only the first output image to pass therethrough. Meanwhile, a polarization film having the same polarization direction as that of the second polarization film attached on the display panel 130 is attached on the right-eye glass, so the right-eye glass allows only the second output image to pass therethrough. As shown in FIG. 3, a polarization film having the same polarization direction as that of the first polarization film attached on the display panel 130 is attached on left-eye glass and right-eye glass of second type polarization glasses 162, so the left-eye glass and right-eye glass of the second type polarization glasses 162 allow only the first output image to pass therethrough. As shown in FIG. 4, a polarization film having the same polarization direction as that of the second polarization film attached on the display panel 130 is attached on left-eye glass and right-eye glass of third type polarization glasses 164, so the left-eye glass and right-eye glass of the third type polarization glasses 164 allow only the second output image to pass therethrough.

The operation of the television receiver illustrated in FIG. 1 will now be described with reference to FIGS. 5 to 12.

Figure 5:
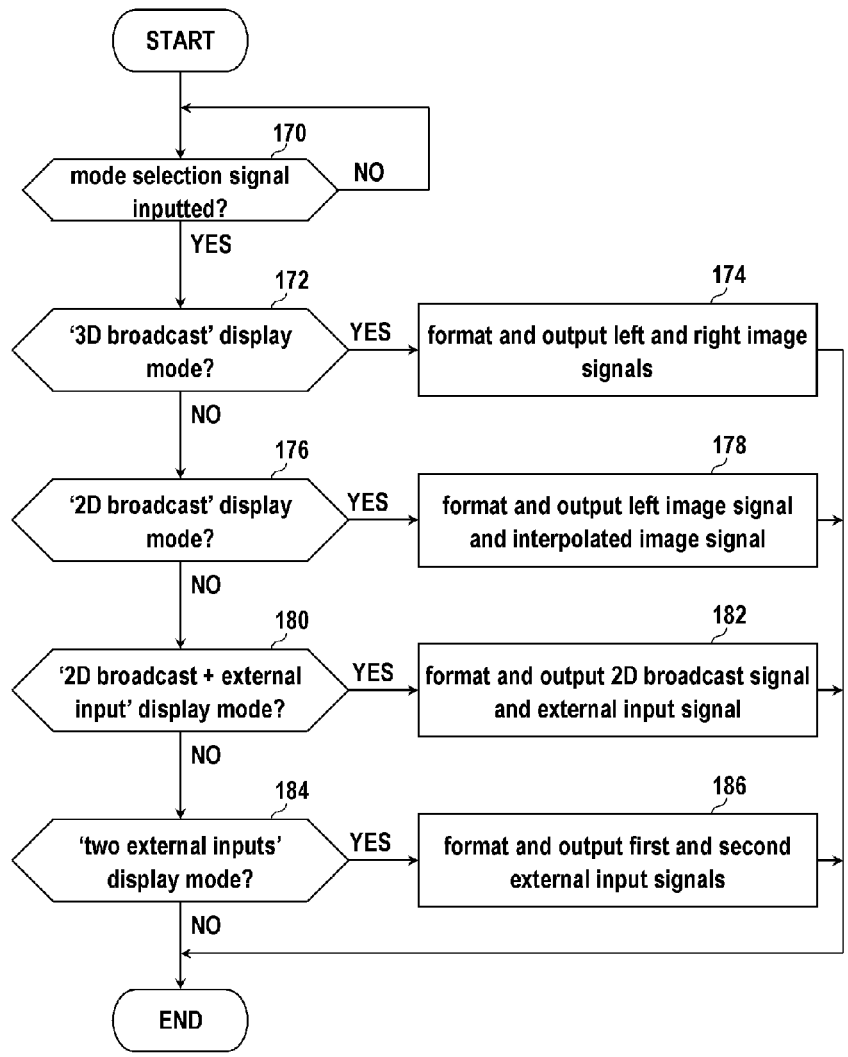
FIG. 5 is a flow chart illustrating the operation of the television receiver of FIG. 1.

FIG. 5 is a flow chart illustrating the operation of the television receiver of FIG. 1. The signal receiving unit 100 selects a broadcast signal of one channel selected by the user from among a plurality of broadcast signals, and demodulates and decodes the selected broadcast signal to restore a left image signal and a right image signal. In a default operation mode, the television receiver formats the left image signal and the right image signal to display a stereoscopic type 3D image. The first switch 123 is in a first switching state in which its output terminal is connected with the first input terminal. Also, the second switch 126 is in a first switching state in which its output terminal is connected with the first input terminal. Accordingly, the left image signal and the right image signal from the image decoding unit 119 are applied to the formatter 128, and the formatter 128 formats the left image signal and the right image signal to display a 3D image on the display panel 130. The main controller 154 keeps monitoring whether or not a mode selection signal is applied from a remote controller or a manipulation panel (step 200), while a 3D image is displayed.

When it is determined that a mode selection signal has been applied in step 170, the main controller 154 determines whether or not the mode selection signal indicates a '3D broadcast' display mode (step 172). If the mode selection signal indicates the '3D broadcast' display mode, the first switch 124 is in the first switching state and the second switch 126 is in the first switching state. Accordingly, the left image signal and the right image signal from the image decoding unit 119 are applied to the formatter 128, and the formatter 128 formats the left image signal and the right image signal to display a 3D image on the display panel 130 (step 174). In the present exemplary embodiment, formatting is performed by interleaving left and right images constituting a pair of stereoscopic images by horizontal line and synthesizing them. In this case, the first polarization film, among the pair of polarization films 132 attached on the front surface of the display panel 130 polarizes the first output image (namely, the left image) and the second polarization film polarizes the second output image (namely, the right image) in a direction different by 90 degrees from that of the first polarization film.

Figure 6:
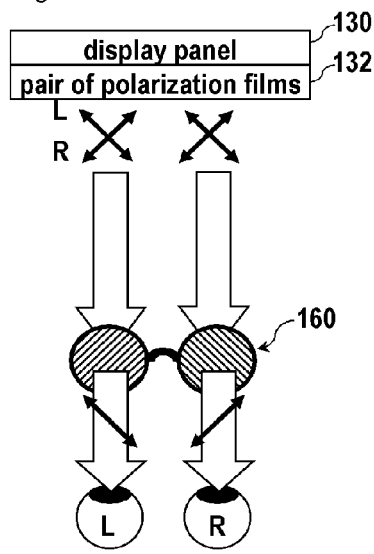
FIG. 6 illustrates a transmission path of a stereoscopic 3D image when a user views the 3D image with the first type polarization glasses.

At this time, the user can view the 3D image by using the first type polarization glasses 160 illustrated in FIG. 2. As shown in FIG. 6, the left-eye glass of the polarization glasses 160 allows only the first output image (namely, the left image) to pass therethrough, and the right-eye glass of the polarization glasses 160 allows only the second output image (namely, the right image) to pass therethrough. Accordingly, the left image is inputted only to user's left eye and the right image is inputted only to user's right eye, enabling a depth perception by the binocular disparity, whereby the user can recognize an image three-dimensionally.

With reference to FIG. 5, when it is determined that the mode selection signal in step 172 does not indicate the '3D broadcast' display mode, the main controller 154 determines whether or not the mode selection signal indicates the '2D broadcast' display mode (step 176). If the mode selection signal indicates the '2D broadcast' display mode, the first switch 124 is in the first switching state, and the second switch 126 is in the second switching state in which the output terminal of the second switch 126 is connected to the second input terminal. Accordingly, the left image signal from the image decoding unit 119 and the image signal obtained by interpolating the left image signal are applied to the formatter 128. Then, the formatter 128 formats the left image signal and the interpolated image signal and outputs the formatted signals to the display panel 130. (step 178). Accordingly, a 2D image which does not cause a binocular disparity is displayed on the display panel.

As mentioned above, in the preferred embodiment, the interpolation unit 122 outputs an image signal with respect to pixel lines which are not included in the left image signal and have pixel values determined by interpolation, as an interpolated signal. Accordingly, the formatter 128 performs formatting by interleaving the left image and the interpolated image by the horizontal line (i.e., in the unit of horizontal line) and synthesizing them. Meanwhile, in a modification, the interpolation unit 122 may output an image signal with respect to every pixel within a frame as an interpolated signal, and the formatter 128 may output only the interpolated signal by the frame on the screen, while disregarding the original left image signal. In a different modification, an interpolation process may not be performed and the formatter 128 may display only the left image.

Figure 7:
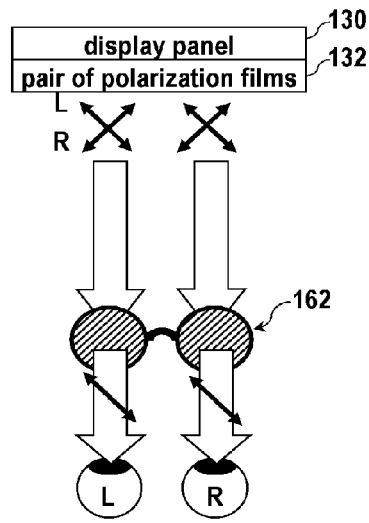
FIG. 7 illustrates a transmission path of an image when a user views the image with the second type polarization glasses.

When the 2D broadcast is displayed in this manner, the user may view the broadcast without wearing the polarization glasses. However, of course, the user may view the 3D image by using the first type polarization glasses 160. When the formatter 128 displays only the left image without performing an interpolation operation in the television receiver, preferably, the user views the image by using the second type polarization glasses 162 as shown in FIG. 7.

With reference to FIG. 5, when it is determined that the mode selection signal does not indicate the '2D broadcast' display mode in step 176, the main controller 154 determines whether or not the mode selection signal indicates a '2D broadcast+external input' display mode (step 180). If the mode selection signal indicates the '2D broadcast+external input' display mode, the first switch 124 is in the first switching state and the second switch 126 is in the third switching state in which the output terminal of the second switch 126 is connected to the third input terminal. Accordingly, the external input signal inputted via the second external input terminal 142 is applied together with the left image signal from the image decoding unit 119 to the formatter 128, and the formatter 128 formats the left image signal and the external input signal and outputs the formatted signals to the display panel 130 (step 182). Accordingly, the left image and the external input image are displayed on the display panel 130. In this case, the first polarization film, among the pair of polarization films 132 attached on the front surface of the display panel 130, polarizes the first output image (namely, the left image) and the second polarization film polarizes the second output image (namely, the external input image) in a direction different by 90 degrees from that of the first polarization film.

Figure 8:
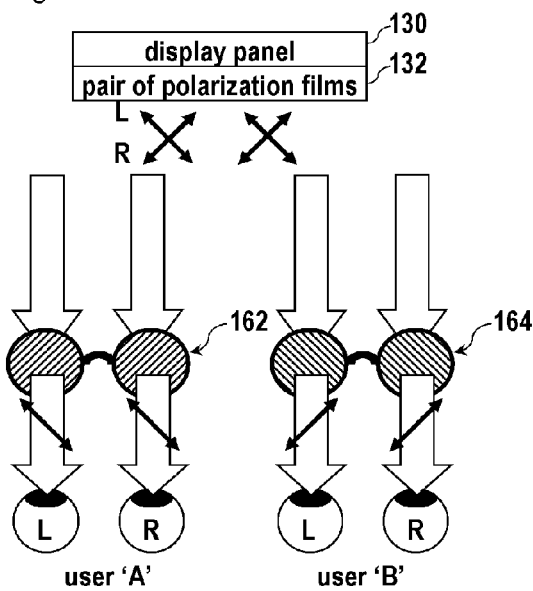
FIG. 8 illustrates a transmission path of an image when two users view the image with the second and third type polarization glasses respectively.

In this case, the user can selectively view the left image or the external input image by using the polarization glasses. In particular, two users may view the left image and the external input image, respectively. Namely, one user may view the left image by using the second type polarization glasses 162 illustrated in FIG. 3, while the other user may view the external input image by using the third type polarization glasses 164 illustrated in FIG. 4. As shown in FIG. 8, the second type polarization glasses 162 allows only the first output image (namely, the left image) to pass therethrough so that the user 'A' wearing it can receive only the left image, and the third type polarization glasses 164 allows only the second output image (namely, the external input image) to pass therethrough so that the user 'B' wearing it can receive only the external input image.

With reference to FIG. 5, if it is determined that the mode selection signal does not indicate a '2D broadcast+external input' display mode in step 180, the main controller 154 determines whether or not the mode selection signal indicates a 'two external inputs' display mode (step 180). When the mode selection signal indicates the 'two external inputs' display mode, the first switch 124 is in the second switching state in which the output terminal of the first switch 124 is connected with the second input terminal and the second switch 126 is in the third switching state. Accordingly, the external input signals inputted via the first and second external input terminals 140 and 142 are applied to the formatter 128, and the formatter 128 then formats the received external input signals and outputs the formatted signals to the display panel 130 (step 186). Then, the first and second external input images are displayed on the display panel 130. At this time, the first polarization film, among the pair of polarization films 132 attached on the front surface of the display panel 130, polarizes the first output image (namely, a first external input image) and the second polarization film polarizes the second output image (namely, a second external input image) in a direction different by 90 degrees from that of the first polarization film.

Figure 9:
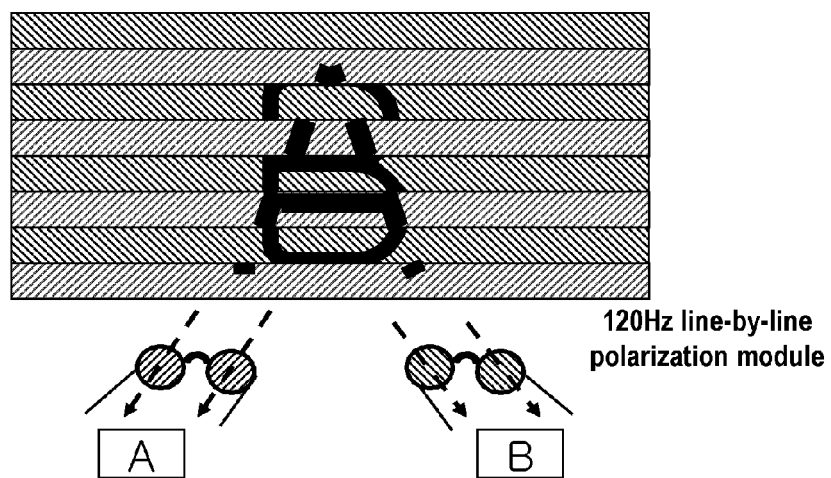
FIG. 9 illustrates an image displayed on a display panel and an image transferred to the visual nerve of each user when two users view an image with the second and third type polarization glasses respectively.

Also, in this case, the user can selectively view the first and second external input images by using the polarization glasses. In particular, two users may view the first and second external input images, respectively. Namely, one user may view the first external input image by using the second type polarization glasses 162 illustrated in FIG. 3, while the other user may view the second external input image by using the third type polarization glasses 164 illustrated in FIG. 4. As shown in FIG. 8, the second type polarization glasses 162 allows only the first output image (namely, the first external input image) to pass therethrough so that the user wearing it can receive only the first external input image, and the third type polarization glasses 164 allows only the second output image (namely, the second external input image) to pass therethrough so that the user wearing it can receive only the second external input image. Accordingly, as shown in FIG. 9, although the two heterogeneous images are displayed on the display panel 130, individual user can view only his interested image by means of the respective polarization glasses 162 and 164.

Figure 10:
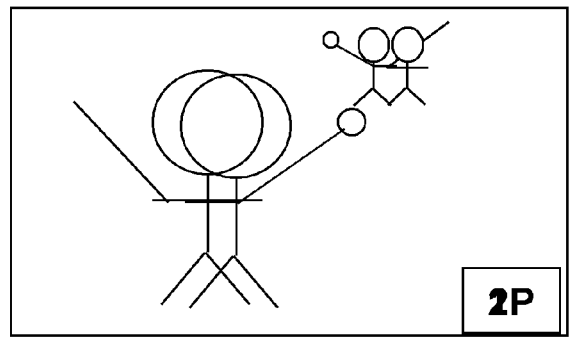
FIGS. 10 to 12 illustrate examples of displaying and separating images when two users play a first person game for two people.
Figure 11:
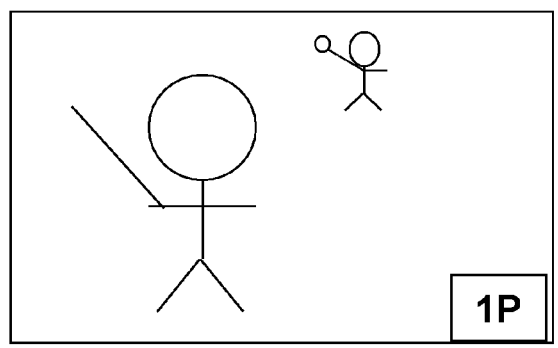
Figure 12:
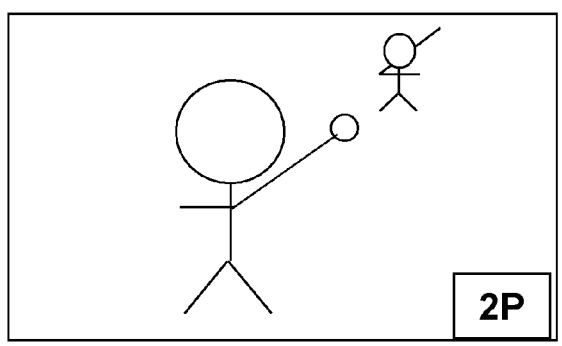

Such operation modes can be advantageously utilized when two users want to display respective images on a single display device, respectively, while playing a first-person game for two people. For example, when two people plays a baseball game and an image from a point of view of a batter is desired to be displayed for one user and an image from a point of view of a pitcher is desired to be displayed for the other user, the two images are received via the external input terminals 140 and 142 and formatted so as to be displayed as a full screen image as shown in FIG. 10. In this case, the user requiring the image from a point of view of the batter may separately receive only the image illustrated in FIG. 11 by means of the second type polarization glasses 162, while the user requiring the image from a point of view of the pitcher may separately receive only the image illustrated in FIG. 12 by means of the third type polarization glasses 164.

Figure 13:
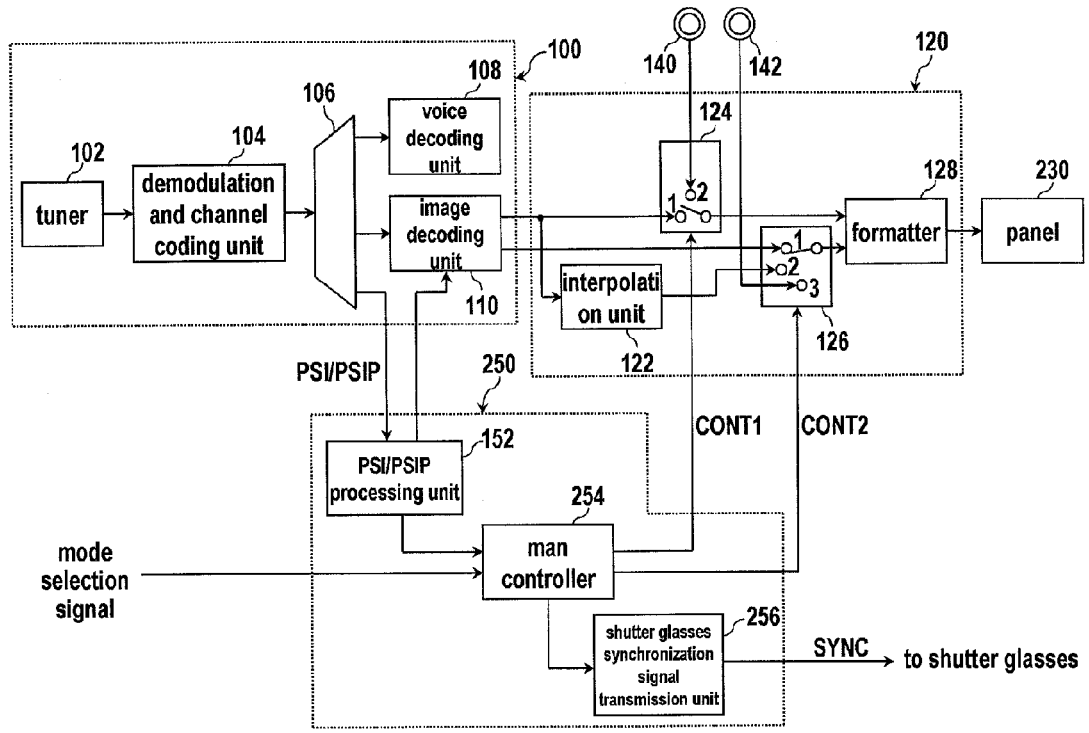
FIG. 13 is a schematic block diagram of a television receiver according to another exemplary embodiment of the present invention.

FIG. 13 is a schematic block diagram of a television receiver according to another exemplary embodiment of the present invention. The television receiver according to another exemplary embodiment of the present invention is suitable for viewing an image by using polarization glasses. The television receiver according to the present exemplary embodiment includes the broadcast signal receiving unit 100, the synthesizing unit 120, a display panel 230 and a system controller 250.

The broadcast signal receiving unit 100 receives a broadcast signal and restores an image signal. The broadcast signal receiving unit 100 includes a tuner 102, a demodulation and channel decoding unit 104, a transport demultiplexing unit 106, a voice decoding unit 108, and an image decoding unit 110. The tuner 102 selects a broadcast signal of one channel selected by the user from among a plurality of broadcast signals and outputs the same. The demodulation and channel decoding unit 104 demodulates the broadcast signal transferred from the tuner 102, performs error correction decoding on the demodulated signal, and then outputs a transport stream (TS). The transport demultiplexing unit 106 demultiplexes the TS to separate a video PES and an audio PES, and extracts PSI/PSIP information. A packet releasing unit (not shown) releases packets with respect to the video PES and the audio PES to restore the video ES and the audio ES. The voice decoding unit 108 decodes the audio ES and outputs an audio bit stream. The audio bit stream is converted into an analog voice signal by a digital-to-analog converter (not shown), amplified by an amplifier (not shown), and then outputted via a speaker (not shown). The image decoding unit 110 decodes the video ES to extract a video bit stream. The image decoding unit 110 decodes the video bit stream and outputs a left image signal and a right image signal in order to implement a stereoscopic 3D image.

The synthesizing unit 120 receives the restored left and right image signals and external input signals and synthesizes images to be displayed on the display panel 230 according to the types of broadcast signals or according to a user selection. In the present exemplary embodiment, the synthesizing unit 120 includes an interpolation unit 122, first and second switches 124 and 126, and a formatter 128.

The interpolation unit 122 receives a base view image signal and interpolates the received image signal. Here, it is assumed that the left image signal is a base view image signal and the right image signal is an extended view image signal. When the restored left image signal has a top-down format, the interpolation unit 122 interpolates the base view image signal by horizontal line (i.e., in the unit of horizontal line). When the restored left image signal has a side-by-side format, the interpolation unit 122 interpolates the base view image signal by vertical line. In the present exemplary embodiment, the interpolation unit 122 outputs an image signal with respect to pixel lines which are not included in the left image signal and have pixel values determined through interpolation, as an interpolated signal.

The first switch 124 receives the left image signal from the image decoding unit 110 by a first input terminal thereof, and receives a first external input signal received via a first external input terminal by a second input terminal thereof. An output terminal of the first switch 124 is connected with a first input terminal of the formatter 128. A switching position of the first switch 124 varies according to a first switching control signal CONT1.

The second switch 126 receives the right image signal from the image decoding unit 110 by a first input terminal thereof, receives the interpolated signal from the interpolation unit 122 by a second input terminal thereof, and receives a second external input signal received via a second external input terminal 142 by a third input terminal thereof. An output terminal of the second switch 126 is connected with the second input terminal of the formatter 128. A switching position of the second switch 126 varies according to a second switching control signal CONT2.

The formatter 128 formats first and second output signals while comparing frame times, so that temporally consistent images can be displayed by pairs on the display panel 230.

The display panel 130 includes a liquid crystal panel and a panel driving circuit for converting the left and right image signals such that they are suitably displayed on the liquid crystal panel, and generating various control signals such as a timing control signal or a driving signal. In the present exemplary embodiment, the display panel 230 formats the signals received via the input terminals by interleaving them in the unit of horizontal lines, in the unit of vertical lines, or in a checkerboard pattern.

The PSI/PSIP processing unit 152 of the system controller 250 receives PSI/PSIP information from the transport demultiplexing unit 106, parses the received PSI/PSIP information, and stores the parsed information in a memory or a register, so that broadcast signals can be decoded and a broadcast can be reproduced based on the stored information. The main controller 254 of the system controller 250 controls overall operations of the television receiver. In particular, the main controller 254 receives a mode selection signal from a manipulation panel provided on a front surface or on a side surface of a remote controller (not shown) or the television receiver, and generates the first switching signal CONT1 and the second switching signal CONT2 in response to the mode selection signal. A shutter glasses synchronization signal transmission unit 256 generates a synchronization signal SYNC for opening and shutting the shutter glasses of the user and transmits the synchronization signal to the shutter glasses under the control of the main controller 254. The transmission of the synchronization signal SYNC may be made through an infrared signal or an ultrasonic wave signal, or may be made through a wire.

As mentioned above, the user using the television receiver of FIG. 13 may view an image by using the shutter glasses. According to an exemplary embodiment of the present invention, the shutter glasses operate according to the synchronization signal SYNC and have three types of modes.

Figure 14:
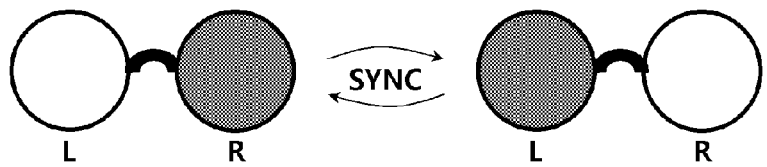
FIG. 14 illustrates a first operation mode of shutter glasses.
Figure 15:
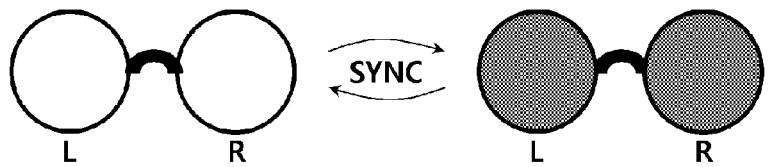
FIG. 15 illustrates a second operation mode of shutter glasses.
Figure 16:
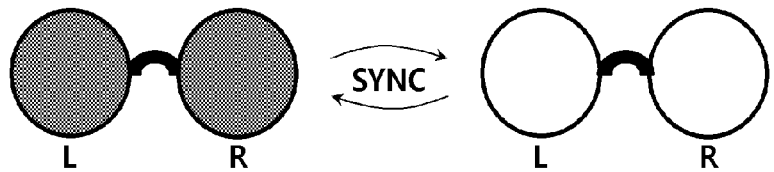
FIG. 16 illustrates a third operation mode of shutter glasses.

In a first mode, as shown in FIG. 14, a left-eye shutter and a right-eye shutter of the shutter glasses are alternately open according to the synchronization signal SYNC. In particular, when a first output signal (e.g., a left image) is displayed, only the left-eye shutter is open, and when a second output signal (e.g., a right image) is displayed, only the right-eye shutter is open. In a second mode, as shown in FIG. 15, when the first output signal is displayed, the left-eye shutter and the right-eye shutter are all open, and when the second output signal is displayed, the left-eye shutter and the right-eye shutter are all shut. Accordingly, in the second mode, the shutter glasses allow only the first output signal to pass therethrough. In a third mode, as shown in FIG. 16, when the first output signal is displayed, left-eye shutter and the right-eye shutter of the shutter glasses are all shut, and when the second output signal is displayed, the left-eye shutter and the right-eye shutter are all open. Accordingly, the shutter glasses allow only the second output signal to pass therethrough in the third mode.

In a preferred embodiment, the shutter glasses may implement all of the first to third modes, and change the modes according to the synchronization signal SYNC. Meanwhile, in a modification, shutter glasses may be separately provided to implement the first to third modes, so the user may select shutter glasses of a required mode.

The operation of the television receiver illustrated in FIG. 13 is similar to that of the television receiver illustrated in FIG. 5. The operation of the television receiver illustrated in FIG. 13 will now be described with reference to FIG. 5.

The main controller 254 continuously monitors whether or not a mode selection signal is applied from a remote controller or a manipulation panel (step 200).

When it is determined that a mode selection signal has been applied in step 170, the main controller 254 determines whether or not the mode selection signal indicates a '3D broadcast' display mode (step 172). If the mode selection signal indicates the '3D broadcast' display mode, the first switch 124 is in the first switching state and the second switch 126 is in the first switching state. Accordingly, the left image signal and the right image signal from the image decoding unit 119 are applied to the formatter 128, and the formatter 128 formats the left image signal and the right image signal to display a 3D image on the display panel 130 (step 174). In the present exemplary embodiment, formatting is performed by sequentially supplying a left image signal and a right image signal to the display panel 230. Accordingly, a left image and a right image area alternately displayed on the display panel 203. In an exemplary embodiment of the present invention, a time duration in which the left image and the right image are displayed on the display panel 230, respectively, is $\frac{1}{120}$ seconds.

Figure 17:
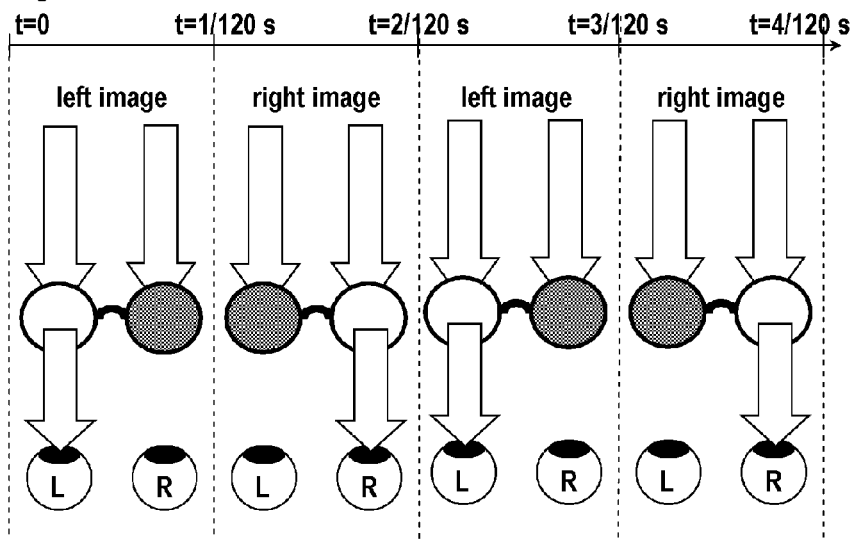
FIG. 17 illustrates an example of a change in an opening and shutting state of shutter glasses when the user views a stereoscopic 3D image in the television receiver of FIG. 13.

The shutter glasses synchronization signal transmission unit 256 generates a synchronization signal SYNC for operating the shutter glasses in the first mode and transmits the generated synchronization signal SYNC to the shutter glasses. The shutter glasses operate in the first mode. Namely, in response to the synchronization signal SYNC, the shutter glasses alternately open and shut the left-eye shutter and the right-eye shutter in the unit of $\frac{1}{120}$ seconds as shown in FIG. 17. Accordingly, the left image is inputted only to user's left eye and the right image is inputted only to user's right eye, enabling a depth perception by the binocular disparity, whereby the user can recognize an image three-dimensionally.

With reference to FIG. 5, when it is determined that the mode selection signal in step 172 does not indicate the '3D broadcast' display mode, the main controller 254 determines whether or not the mode selection signal indicates the '2D broadcast' display mode (step 176). If the mode selection signal indicates the '2D broadcast' display mode, the first switch 124 is in the first switching state, and the second switch 126 is in the second switching state in which the output terminal of the second switch 126 is connected to the second input terminal. Accordingly, the left image signal from the image decoding unit 119 and the image signal obtained by interpolating the left image signal by the line are applied to the formatter 128. Then, the formatter 128 formats the left image signal and the interpolated image signal and outputs the formatted signals to the display panel 230. (step 178). Accordingly, a 2D image which does not cause a binocular disparity is displayed on the display panel 230.

Also, in the present exemplary embodiment, the interpolation unit 122 outputs an image signal with respect to pixel lines having pixel values determined by interpolation, which is not included in the left image signal, as an interpolated signal. Accordingly, the formatter 128 performs formatting by sequentially supplying the left image and the interpolated image to the display panel 230. Accordingly, the left image and the interpolated image are alternately displayed on the display panel 230. When the 2D broadcast is displayed in this manner, the user may view the broadcast with his naked eyes without wearing the shutter glasses. However, of course, the user may view the 2D image through the shutter glasses operating in the first mode.

Figure 18:
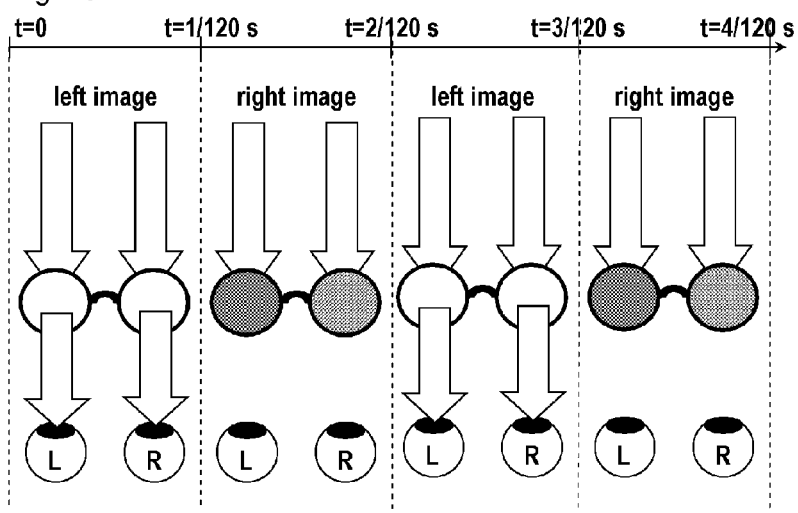
FIG. 18 illustrates an example of a change in an opening and shutting state of the shutter glasses when the user views a 2D image in the television receiver of FIG. 14.

Meanwhile, in a modification of the exemplary embodiment of FIG. 13, the television receiver may not include the interpolation unit 122. In this case, the formatter 128 may display only the left image without the right image in displaying the 2D image. In this embodiment, the user may view the broadcast with his naked eyes. In this case, however, when the user wears the shutter glasses, preferably, the shutter glasses operate in the second mode. Namely, as shown in FIG. 18, the shutter glasses may open the left-eye shutter and the right-eye shutter for $\frac{1}{120}$ seconds to allow the left image to pass therethrough, and then shuts the left-eye shutter and the right-eye shutter for a following $\frac{1}{120}$ seconds.

With reference to FIG. 5, when it is determined that the mode selection signal does not indicate the '2D broadcast' display mode in step 176, the main controller 254 determines whether or not the mode selection signal indicates a '2D broadcast+external input' display mode (step 180). If the mode selection signal indicates the '2D broadcast+external input' display mode, the first switch 124 is in the first switching state and the second switch 126 is in the third switching state. Accordingly, the external input signal inputted via the second external input terminal 142 is applied together with the left image signal from the image decoding unit 119 to the formatter 128, and the formatter 128 formats the left image signal and the external input signal and outputs the formatted signals to the display panel 230 (step 182). Accordingly, the left image and the external input image are displayed on the display panel 230. At this time, the first output image (namely, the left image), and the second output image (namely, the external input image) are alternately displayed at every $\frac{1}{120}$ seconds.

Figure 19:
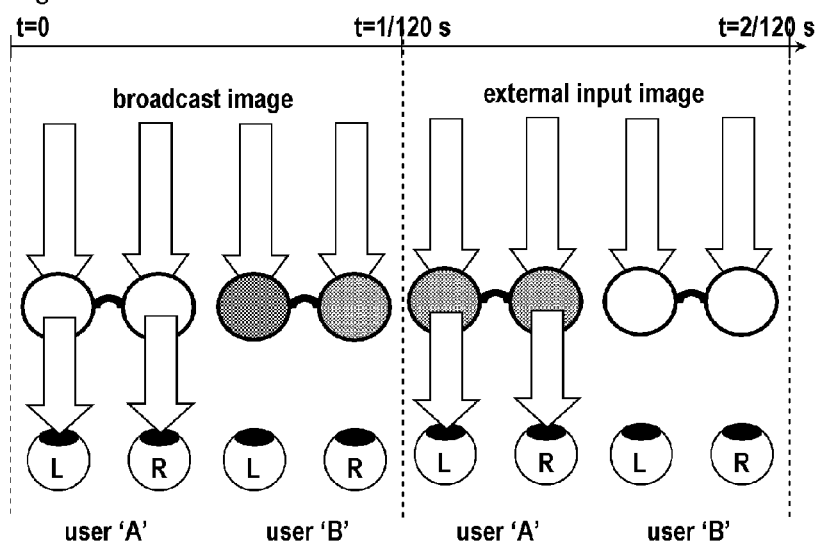
FIG. 19 illustrates an example of a change in an opening and shutting state of the shutter glasses of each user when two users view a 2D broadcast image and an external input image, respectively.

In this case, the user can selectively view the 2D broadcast image or the external input image by using the shutter glasses in the second mode or in the third mode. In particular, two users may view the left image and the external input image, respectively. Namely, the user 'A' may view the 2D broadcast image by using the shutter glasses in the second mode illustrated in FIG. 15, while the user 'B' may view the external input image by using the shutter glasses in the third mode illustrated in FIG. 16. As shown in FIG. 19, the shutter glasses in the second mode allows only the first output image (namely, the 2D broadcast image) to pass therethrough so that the user wearing it can receive only the 2D broadcast image, and the shutter glasses in the third mode allows only the second output image (namely, the external input image) to pass therethrough so that the user wearing it can receive only the external input image.

With reference to FIG. 5, if it is determined that the mode selection signal does not indicate a '2D broadcast+external input' display mode in step 180, the main controller 254 determines whether or not the mode selection signal indicates a 'two external inputs' display mode (step 180). When the mode selection signal indicates the 'two external inputs' display mode, the first switch 124 is in the second switching state and the second switch 126 is in the third switching state. Accordingly, the external input signals inputted via the first and second external input terminals 140 and 142 are applied to the formatter 128, and the formatter 128 then formats the received external input signals and outputs the formatted signals to the display panel 230 (step 186). Then, the first and second external input images are displayed on the display panel 230. At this time, the first output image (namely, the first external input image) and the second output image (namely, the second external input image) are alternately displayed at every $\frac{1}{120}$ seconds.

Also, in this case, the user can selectively view the first and second external input images by using the shutter glasses. In particular, two users may view the first and second external input images, respectively. Namely, one user may view the first external input image by using the shutter glasses of the second mode illustrated in FIG. 15, while the other user may view the second external input image by using the shutter glasses of the third mode illustrated in FIG. 16. As shown in FIG. 20, the shutter glasses of the second mode allows only the first output image (namely, the first external input image) to pass therethrough so that the user 'A' wearing it can receive only the first external input image, and the shutter glasses of the third mode allows only the second output image (namely, the second external input image) to pass therethrough so that the user 'B' wearing it can receive only the second external input image. Accordingly, although the two heterogeneous images are displayed on the display panel 230, individual user can view only his interested image by means of the respective shutter glasses. As mentioned above, such operation modes can be advantageously utilized when two users want to display respective images on a single display device, respectively, while playing a first-person game for two people.

The exemplary embodiments of the present invention have been described, but the present invention may be modified in various manners or may be embodied into a substantial form without departing from its technical idea or essential characteristics.

For example, although not shown for the sake of brevity, the television receiver according to the present invention may additionally include a scaler for making formats of external input signals correspond to standards.

Meanwhile, in the above description, the operation mode of the television receiver is changed in response to a mode selection signal from the remote controller or manipulation panel. However, the determining of the operation mode may be affected by image attribute information transferred via a PSIP or a picture header of a video ES. For example, when image attribute information transferred via the PSIP or the picture header of the video ES indicates a 2D image, the main controller may set the operation mode as the '2D broadcast' display mode although a mode selection signal is not applied.

Also, in the exemplary embodiments of FIGS. 1 to 13, the interpolation unit is provided to increase the brightness of an image in the '2D broadcast' display mode, but the interpolation unit may be omitted in a modification. In this case, the formatter may output only the base view image or the extended view image as a left image or a right image, or may output only the base view image or the extended view image as same left and right images.

In a modification, the television receiver may include two signal receiving units 100. In this case, broadcast images of two channels may be formatted to be displayed, instead of displaying a 2D image and an external image or displaying two external images.

Also, the exemplary embodiment in which an external image displayed together with a 2D image is inputted via the second external input terminal 142 has been mainly described, but the present invention is not limited thereto and the external image inputted via the first external input terminal 140 may be displayed together with the 2D image.

Contents may be created in different languages, so that the user can view presentation data in a language familiar to him by simply selecting glasses for presentation.

As so far described, the television receiver according to the present invention can display a stereoscopic 3D image or a 2D image according to the type of a broadcast signal or according to a user selection. Also, because images of heterogeneous contents can be simultaneously displayed, users can simultaneously view two types of images as entire screen images with a single television receiver.

The present invention can be implemented in a polarization type or shutter glasses type stereoscopic television. Also, the present invention can be applicable to a display device, other than a television receiver, such as a PC, a video player, and the like. In addition, the present invention can be also applicable to any other type of stereoscopic display device than the polarization type or shutter glass type display device.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. An image display method of a three-dimensional (3D) display device, the method comprising:
   receiving, via a signal receiving unit, a broadcast signal and restoring a base view image signal and an extended view image signal constituting a pair of stereoscopic images;
   determining, via a controller, one operation mode selected from an operation mode group including first and second operation modes;
   formatting, via a signal synthesizing unit, the base view image signal and the extended view image signal and displaying the same in a stereoscopic manner in the first operation mode;
   formatting, via the signal synthesizing unit, two image signals different from the pair of stereoscopic images and displaying the same in the second operation mode, wherein the two image signals are first and second external input signals received via at least one external input terminal;
   selecting, via a switching unit, the first and second external input signals received in response to a switching control signal;
   and formatting the selected first and second external input signals,
   wherein the base view image signal and the extended view image signal are received via the switching unit from the signal receiving unit, and the first and second external input signals are received via the external input terminal, and wherein the switching control signal is supplied via the controller according to the operation mode.

2. The method of claim 1, wherein the two image signals are the base view image signals.

3. The method of claim 1, wherein the displaying of the two formatted image signals in the second operation mode comprises:
interpolating the base view image signal to generate an interpolated image signal, and wherein the two image signals are the base view image signal and the interpolated image signal.

4. The method of claim 1, wherein the displaying of the two formatted image signals in the second operation mode comprises:
interpolating the base view image signal to generate an interpolated image signal, and wherein the two image signals are all the interpolated image signals.

5. The method of claim 1, wherein the two image signals are a base view image signal and an external input signal.

6. The method of claim 1, wherein the first or second operation mode is determined by a user command applied via an input unit provided in the 3D display device.

7. The method of claim 1, wherein the first or second operation mode is determined according to image attribute information included in the broadcast signal.

8. A three-dimensional (3D) display device comprising:
a display unit;
a signal receiving unit configured to receive a broadcast signal and restore a base view image signal and an extended view image signal constituting a pair of stereoscopic images;
a signal synthesizing unit configured to format the base view image signal and the extended view image signal in a first operation mode, format two image signals different from the pair of stereoscopic images in a second operation mode, and supply the formatted signals to the display unit;
a controller configured to determine the operation mode; and at least one external input terminal, wherein the signal synthesizing unit comprises:
a switching unit configured to receive the base view image signal and the extended view image signal from the signal receiving unit, receive the first and second external input signals via the external input terminal, and select two signals from among signals received in response to a switching control signal;
and a formatter configured to format the two selected signals, wherein the controller supplies the switching control signal according to the operation mode, and wherein the two image signals are first and second external input signals.

9. The display device of claim 8, wherein the signal synthesizing unit comprises: an interpolation unit configured to receive and interpolate the base view image signal and supply the interpolated image signal to the switching unit.

10. The display device of claim 8, wherein the formatter formats the two selected signals through spatial interleaving, and the display unit comprises a panel with a polarization film installed on its front surface.

11. The display device of claim 8, wherein the formatter formats the two selected signals in a time-sequence manner by frame, and the display device further comprises: shutter glasses comprising a left-eye shutter and a right-eye shutter and having first and second modes determined according to an opening and shutting control signal, wherein the left-eye shutter and the right-eye shutter are alternately open and shut in the first mode and the left-eye shutter and the right-eye shutter are simultaneously open and shut in the second mode, and wherein the controller comprises: a control signal generating unit configured to generate the opening and shutting control signal.

* * * * *